United States Patent [19]
Lee

[11] Patent Number: 5,869,011
[45] Date of Patent: Feb. 9, 1999

[54] FIXED-BED CATALYTIC REACTOR

[76] Inventor: Jing Ming Lee, 11602 Blair Meadow, Stafford, Tex. 77477

[21] Appl. No.: 618,987

[22] Filed: Mar. 20, 1996

Related U.S. Application Data

[63] Continuation-in-part of Ser. No. 189,968, Feb. 1, 1994, Pat. No. 5,520,891.

[51] Int. Cl.$^6$ ................................. F28D 7/08; C07C 1/04
[52] U.S. Cl. ........................ 422/200; 422/201; 48/197 R; 518/712
[58] Field of Search .............................. 48/197 R, 198.8; 422/200, 201; 518/712

[56] References Cited

U.S. PATENT DOCUMENTS

| | | | |
|---|---|---|---|
| 1,396,718 | 11/1921 | Backhaus | 422/199 |
| 2,078,948 | 5/1937 | Houdry | 422/148 |
| 2,276,307 | 3/1942 | Houdry | 422/200 |
| 2,432,543 | 12/1947 | Prickett et al. | 422/200 |
| 2,440,436 | 4/1948 | Creel | 422/220 |
| 2,989,383 | 6/1961 | Miller | 422/200 |
| 4,235,844 | 11/1980 | Sterzel et al. | 422/138 |
| 4,321,234 | 3/1982 | Ohsaki et al. | 422/200 |
| 4,525,482 | 6/1985 | Ohsaki et al. | 48/197 R |
| 4,542,252 | 9/1985 | Graziani et al. | 422/200 |
| 4,594,227 | 6/1986 | Ohsaki et al. | 422/148 |
| 4,714,592 | 12/1987 | Zanma | 422/148 |
| 5,011,945 | 4/1991 | Taheri | 549/260 |
| 5,190,731 | 3/1993 | Stahl | 422/148 |
| 5,236,671 | 8/1993 | Grotz | 422/148 |
| 5,520,891 | 5/1996 | Lee | 422/201 |

*Primary Examiner*—Tae Yoon
*Attorney, Agent, or Firm*—Daniel N. Lundeen

[57] ABSTRACT

Disclosed are a fixed-bed, catalytic reactor wherein reaction heat can be exchanged against a heat exchange medium circulating indirectly through the catalyst bed, and a catalytic process comprising operation of the reactor. The reactor comprises a catalyst bed having internally embedded banks of heat exchange tubes. An inlet distributor distributes reactants for flow through the bed. The distributed fluid passes through the bed in a flow path wherein a catalytic reaction occurs. The reaction effluent is then collected from the bed by an outlet product collector. A heat exchange medium circulated through the internal heat exchange tubes adds or removes reaction heat as required for enhanced conversion in the reactor. Multiple heat exchange tubes can be used, and inlet and discharge manifolds are provided for distributing the circulating heat exchange medium. The heat exchange tubes can be spaced in accordance with the heat interchange required to optimize the reaction rate.

19 Claims, 8 Drawing Sheets

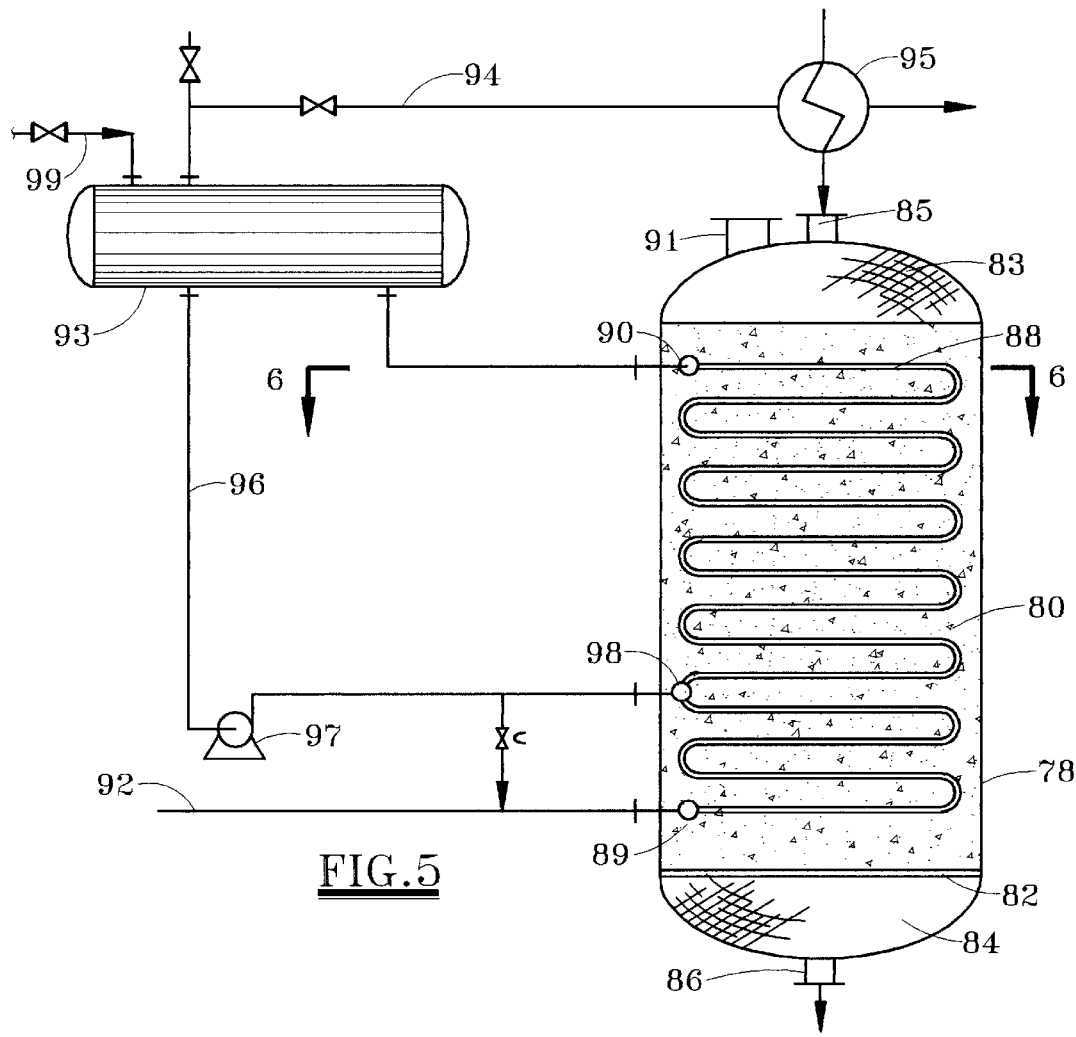
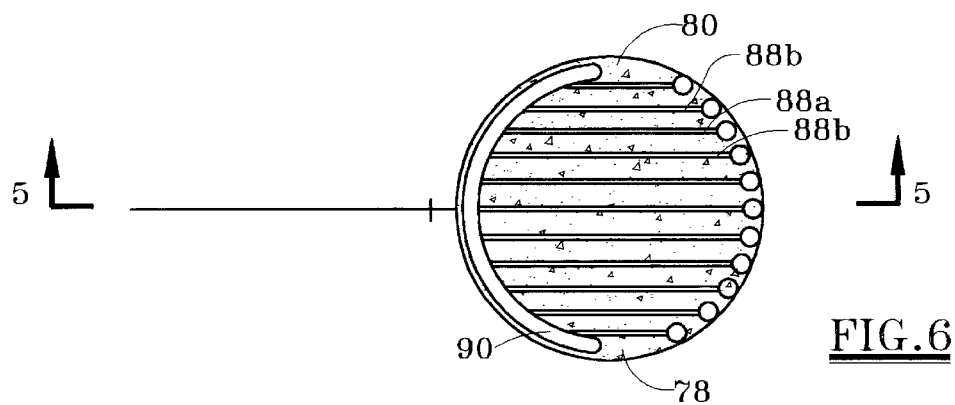

FIXED-BED CATALYTIC REACTOR

CROSS REFERENCE TO RELATED APPLICATION

This application is a continuation-in-part of U.S. Ser. No. 189,968 filed Feb. 1, 1994, now U.S. Pat. No. 5,520,891.

FIELD OF THE INVENTION

The present invention relates to a fixed-bed catalytic reactor, and more particularly to a reactor having internal heat exchange tubes for the addition or removal of reaction heat.

BACKGROUND OF THE INVENTION

The efficiency of an exothermic reaction process often depends primarily on the efficiency of removing large amounts of reaction heat evolved. For an exothermic reaction, the reaction rate and the equilibrium conversion factors usually move oppositely with increasing temperature. Thus, raising the temperature will speed up the rate of the forward reaction, but will decrease the maximum attainable conversion. For increased conversion in a reversible exothermic reaction, a high temperature should be used where the system is far from equilibrium to take advantage of the high reaction rate, but as equilibrium is approached, the temperature should be reduced to shift the equilibrium conversion to a more favorable value. An optimal reactor operating curve (or temperature progression) which maximizes reaction rate is a path corresponding to a locus of maximum rates on a temperature-conversion plot. This path generally follows a decreasing temperature profile moving from the reactor inlet to outlet.

In an endothermic reaction, equilibrium conversion and reaction rate both usually increase with temperature. Thus, the optimum reaction temperature is the maximum temperature allowed. Factors which govern an upper temperature limit include materials of construction, product properties, side reactions, and the like.

For an adiabatic-type fixed bed reactor, it is known that the optimal path (or temperature progression) can be most closely approximated using staged beds with a proper gas flow and interchange of heat. The more stages used, the better the approximation. In practice, prior art reaction processes have been limited to two or three stages with the major limitation being the capital costs for multiple reactor vessels and heat exchange equipment.

Fixed bed catalytic processes are further affected from an efficiency point of view by the pressure drop across the bed. It is known that pressure drop depends on the resistance of the flow path which, in turn, is generally proportional to path length and the particle size of the catalyst. Excessive pressure drop can result in channeling through the bed, poor catalyst efficiency and higher compression energy. Reactors with cylindrical geometry can have direct reactant flows through the bed. Axial flows have typically been used, despite having a longer flow path compared to cross-flow, apparently due to the difficulty of axially distributing the reactants (for a transverse flow path) and controlling the temperature progression for maximized results.

Accordingly, there is a need in the art for a reactor design which can implement a flow regime for reduced pressure drop and an optimized temperature progression for enhanced reaction rate without excessive capital expense.

U. S. Pat. Nos. 2,276,307 to Houdry and 2,432,543 to Prickett et al. describe catalytic converters comprising tubes disposed throughout a bed of catalyst material in order that a heat exchange fluid can be circulated indirectly through the bed.

U. S. Pat. No. 2,989,383 to Miller describes an adsorption apparatus having a plate heat exchanger assembly embedded in the adsorbent bed for controlling the temperature uniformity of the bed.

SUMMARY OF THE INVENTION

The efficiency of an exothermic or endothermic fixed-bed reaction process can be significantly enhanced by directing reactant flows through a catalytic reactor having internal heat exchange. Internal heat exchange tubes effectively partition a single-stage catalyst bed into a plurality of heat interchanged catalyst stages in a single reactor arrangement. In such a manner, an optimal temperature progression in the reactor can be more closely approximated. Use of a transverse flow path reduces pressure drop across the reactor and permits utilization of a smaller catalyst particle size. Use of an axial flow path facilitates construction of relatively small reactors, and the use of hot gas as the tubeside fluid where there is a large temperature difference between the inlet and outlet.

In one embodiment, the present invention provides a cross-flow, fixed-bed catalytic reactor. The reactor comprises a generally cylindrical catalyst bed extending axially upwardly from a bottom region to an upper region spaced therefrom, and transversely from a reactant distributor at an inlet end across to a product collector at an opposite end spaced therefrom. A cross-flow path is provided for fluid to pass from the reactant distributor, transversely through a plurality of alternating generally axial catalyst layers and tube banks, to the product collector. A supply manifold is provided for feeding a heat transfer fluid to the tube banks. A return manifold is provided for gathering heat transfer fluid from the tube banks. Respective fluid seals are provided adjacent the bottom and top regions for inhibiting fluid bypass of the catalyst bed from the cross-flow path. The reactor internal walls can be insulated for limiting the heat exposure thereof. The reactant distributor and the product collector are preferably formed adjacent an inside wall of the reactor. The reactant distributor and product collector each preferably comprise a screen spaced from the inside wall of the reactor to form an axial catalyst-free channel, the screen having a middle permeable section bounded adjacent the upper and lower regions by an impermeable section extending axially to an impermeable baffle which extends radially between the impermeable section and the inside wall of the reactor. The fluid seals comprise transverse strata of substantially unused catalyst between corresponding sections of the reactant distributor and the product collector. The reactor includes a catalyst-free zone adjacent the catalyst seal zones of sufficient size to permit thermal expansion of the catalyst and the heat exchange tubes. The catalyst-free zones comprise a low density, heat resistant filler material. Each tube bank comprises a plurality of laterally spaced axial tubes. Total heat transfer surface area and lateral spacing of the tubes in each tube bank are relatively varied among the separate tube banks. The tubes are most densely spaced in the bank adjacent the reactant distributor, are progressively less densely spaced in tube banks spaced further from the reactant distributor, and least densely spaced in the bank adjacent the product collector. The tube banks comprise U-bend tubes. Alternatively, the tube banks can comprise once-through tube rows. Manways at the bottom and upper regions are preferably provided for catalyst loading and unloading.

In an alternate embodiment, the present invention provides an axial-flow fixed bed catalytic reactor. The reactor comprises a generally cylindrical catalyst bed extending axially upward from a bottom region to an upper region spaced therefrom. A flow path is provided for fluid to pass between the upper and bottom regions through a plurality of generally transverse catalyst layers and tube banks disposed in the catalyst bed. A supply manifold is provided for feeding a heat transfer fluid to the tube banks, and a return manifold for gathering heat transfer fluid from the tube banks. The reactor internal walls can be insulated for limiting the heat exposure thereof. A reactant distributor and a product collector are preferably respectively formed adjacent the upper and bottom regions of the reactor. The product collector preferably includes a transverse screen spaced from the inside wall of the reactor to support the catalyst bed thereon and form a catalyst-free zone below the screen. Alternatively, a perforated pipe section is mounted in a catalyst free zone at a lower end of the reactor as the product collector. The reactor preferably includes a catalyst-free zone adjacent the upper region which is of sufficient size to permit thermal expansion of the catalyst and the tube banks. The catalyst-free zones preferably comprise a low density, heat resistant filler material. Each tube bank preferably comprises a plurality of laterally spaced transverse tubes. The total heat transfer surface area and spacing of the tubes between adjacent tube banks can be relatively varied among the separate tube banks. The tubes can be most densely spaced in the banks adjacent the upper region, progressively less densely spaced in tube banks spaced further from the upper region, and least densely spaced in the banks adjacent the bottom region. The tube banks can conveniently be formed from U-bend tubes.

In another embodiment, the present invention provides a catalytic reaction process. As a first step, process fluid reactants are introduced to the reactant distributor in the reactor described above. As another step, the fluid is passed along the flow path from the distributor for catalytic reaction in the catalyst layers. A heat transfer fluid is circulated from the supply manifold, through the tube banks wherein heat is exchanged with the process fluid as it passes across the tube banks between the catalyst layers, and to the return manifold. In the cross-flow reactor, the fluid seals are effectively maintained above and below the catalyst bed to inhibit process fluid from bypassing the catalyst bed. Process fluid product is collected at the product collector. The heat transfer fluid can comprise boiler feed water, steam, molten salt, a process fluid, a combination thereof, or the like.

As one example of the present process, the fluid reactants can comprise generally stoichiometric hydrogen and nitrogen, and the process fluid product comprises ammonia. The present ammonia synthesis process can further include the steps of: preheating the process fluid reactants in a cross-exchanger against a product stream; passing the preheated fluid reactants through the tube banks as the heat transfer fluid; passing fluid from the return manifold through a boiler to generate steam and cool the fluid to form a preconditioned reactant stream; passing the preconditioned reactant stream through the flow path of the catalytic reactor; passing the process fluid product from the product collector through a boiler to produce steam and form a partially cooled product stream; and supplying the partially cooled product stream to the cross-exchanger for the reactant preheating step. Alternatively, the heat exchange medium can comprise a molten salt in which case the present ammonia synthesis process can further comprise the steps of: preheating the process fluid reactants in a cross-exchanger against a product stream; passing the preheated reactants through the flow path of the catalytic reactor; passing a molten salt through the tube banks as the heat transfer fluid; and passing the molten salt from the return manifold through a boiler to generate steam and cool the molten salt for recirculation through the tube banks.

As another example of the present process, the reactants can comprise shift gas including a mixture of hydrogen, carbon monoxide, carbon dioxide and steam, and the process fluid product is richer in hydrogen and carbon dioxide. The present shift process can further comprise the steps of supplying boiler feed water at a temperature between about 150°–190° C. as the heat transfer fluid to the supply manifold; supplying shift gas at a temperature between about 180–240° C. to the reactant distributor; maintaining the maximum temperature in the catalyst bed below about 270° C.; and maintaining the process fluid product collected at the product collector at least about 10° C. above its dewpoint. A first catalyst layer disposed between the reactant distributor and a first tube bank can contain less than about 5 percent of the total catalyst volume of the catalyst bed. A last catalyst layer disposed between a last tube bank and the product collector can contain less than about 10 percent of the total catalyst volume of the catalyst bed. Intermediate individual catalyst layers can contain a generally increasing volume of the total catalyst volume of the catalyst bed from adjacent the first catalyst layer to adjacent the last catalyst layer.

As a further example of the present process, the reactants can comprise synthesis gas including hydrogen and carbon monoxide, and the process fluid product comprises methanol. The present methanol synthesis process can further comprise the steps of: preheating the synthesis gas in a cross-exchanger against a stream of the process fluid product from the product collector; passing the preheated synthesis gas through the flow path of the catalytic reactor; and circulating boiler feed water through the tube banks as a cooling medium. The boiler feed water circulation can include pumping boiler feed water in a supply line from a steam drum to the supply manifold, introducing at least partially vaporized fluid from the return manifold to the steam drum, collecting steam and condensate for separation in the steam drum, obtaining steam from the steam drum, blowing down a portion of the condensate from the steam drum, and supplying makeup boiler feed water to the supply line.

As yet another example of the present process, the reactants stream comprise a mixture of hydrocarbon and air, and the process fluid product comprises maleic anhydride.

BRIEF DESCRIPTION OF THE DRAWINGS

FIG. 5 illustrates a schematic side view of one embodiment of the axial-flow, fixed bed reactor of the present invention as seen along the lines 5—5 of FIG. 6.

FIG. 6 illustrates a schematic cross-sectional view of the reactor of FIG. 5 as seen along the lines 6—6.

DETAILED DESCRIPTION OF THE INVENTION

Figure 1:
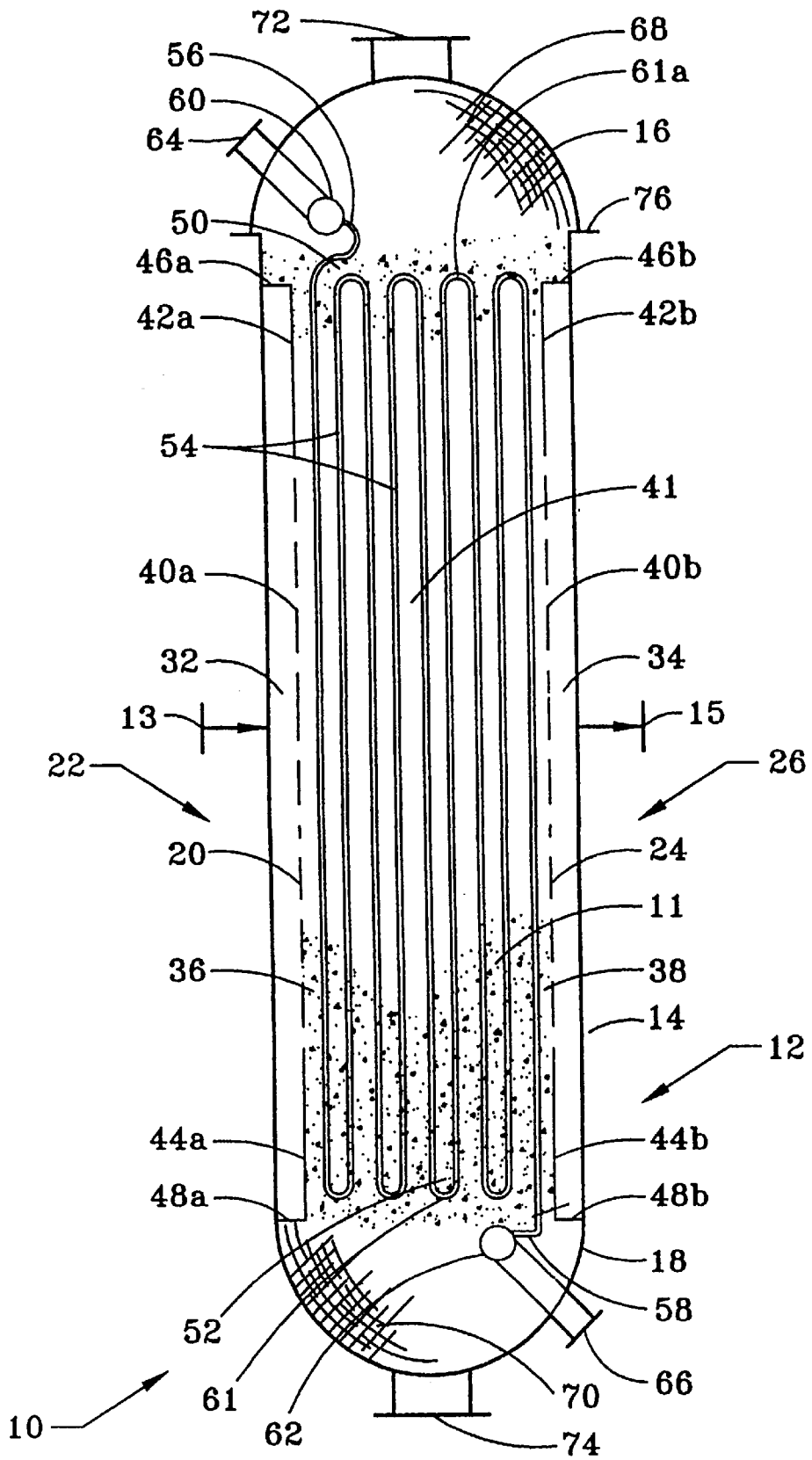
FIG. 1 illustrates a schematic side view of one embodiment of the cross-flow, fixed-bed catalytic reactor of the present invention as seen along the lines 1—1 of FIG. 2.

A fixed-bed catalytic reactor of the present invention employs internal heat exchanger tubes to partition a nominally single stage catalyst bed into multiple heat interchanged stages in a single reaction vessel to significantly increase efficiency. In such a manner, a greater number of catalyst stages than previously contemplated by the art can be obtained without the need of additional reactor vessels, piping, heat exchange equipment and the like. In addition, use of a shorter flow path through the larger flow area of the catalyst bed permits the present reactor to use a smaller catalyst particle size without increasing reactor pressure drop for enhanced performance.

Referring to FIGS. 1–4 wherein like numerals reference like parts, a fixed-bed, cross-flow, gas phase catalytic reactor 10 is suitable for conducting most endothermic or exothermic gas phase chemical reactions ordinarily carried out using a fixed- or packed-bed catalyst. Examples of commercially practiced exothermic-type, fixed-bed, gas phase catalytic reactions which can be effected in the reactor 10 include: the shift reaction for producing carbon monoxide and hydrogen; synthesis reactions for producing methanol and ammonia; methanation; hydrocarbon oxidation for synthesizing maleic anhydride; and the like.

Examples of commercially practiced endothermic-type, fixed-bed, gas phase catalytic reactions which can be effected in the reactor 10 include reactions for steam-cracking higher molecular weight saturated hydrocarbons (middle and lower range alkanes) into lower molecular weight unsaturated hydrocarbons (e.g. ethylene); hydroformylation reactions (oxo process) for producing aldehydes and alcohols from olefins; and the like.

The reactor 10 comprises a fixed bed 11 of catalyst particles disposed in a housing 12 having a gas inlet pipe 13 and a gas outlet pipe 15. The housing 12 is made up of a generally cylindrical shell section 14 and hemispherical upper and lower heads 16, 18. While the precise design of the housing 12 will depend on the process involved, manufacture rate, and practitioner preference, geometry of the present catalytic reactor 10 is preferably circularly cylindrical to establish a suitable flow configuration through the catalyst bed 11 which maximizes catalyst usage, and minimizes hot spots and dead volume. However, other geometries could conceivably be used, including rectangular and other polygonal cross-sections. The reactor 10 of the present invention can be conveniently mounted vertically as shown in FIGS. 1–4 without warping and distortion of the shell 14 since internal cooling minimizes potential shell temperature differential.

An axially oriented reactant distributor 20 is mounted along the length of the shell 14 at a gas inlet side 22. Similarly, an axially oriented product collector 24 is mounted along the length of the shell 14 at a gas outlet side 26. The reactant distributor 20 substantially evenly distributes a gaseous reaction stream introduced through the inlet pipe 13 along the axial dimension of the catalyst bed 11 to ensure efficient usage of the available catalyst, a substantially constant residence time and path length and establish a cross-flow path 27 therethrough (see FIG. 4). The product collector 24 collects and channels the reaction effluent stream through the outlet pipe 15.

In a preferred embodiment, the reactant distributor 20 and product collector 24 preferably comprise an axially oriented wire screen spaced from an internal shell wall to form respective catalyst-free inlet and outlet channels 32, 34 adjacent catalyst bed inlet and outlet ends 36, 38. The wire screens of the gas distributor/collector 20, 24 include middle gas-permeable sections 40a, 40b, defining a catalyst bed active zone 41, bounded at upper and lower ends by gas impermeable sections 42a, 42b, 44a, 44b. The gas impermeable sections 42a, 42b, 44a, 44b extend axially to terminal, gas impermeable baffle plates 46a, 46b, 48a, 48b, respectively, which in turn, extend radially between the impermeable sections 42a, 42b, 44a, 44b and the inside shell wall. The gas permeable screen sections 40a, 40b have a mesh size suitable for excluding essentially all the catalyst particles from the catalyst-free inlet and outlet channels 32, 34. A substantially uniform resistance provided by the catalyst bed substantially uniformly distributes incoming gas along the inlet channel 32 adjacent the screen gas permeable section 40a.

The upper and lower gas impermeable sections 42a, 44a and associated baffle plates 46a, 48a of the reactant distributor 20 and the upper and lower gas impermeable sections 42b, 44b and associated baffle plates 46b, 48b of the product collector 24 define upper and lower seal regions 50, 52 of the catalyst bed 11 from which gas flow is inhibited. The exclusion or seal regions 50, 52, have a sufficient resistance to gas flow to substantially prevent gas bypass of the catalyst bed 11 (e.g. into the space of the reactor heads 16, 18). In addition, the upper seal region 50 can supply additional catalyst to compensate for catalyst settling in the active zone 41. The resistance provided by the seal regions 50, 52 will depend on the zone length which will, in turn, depend on the length of the gas impermeable screen sections 42a, 42b, 44a, 44b, assuming a substantially uniform catalyst particle size.

The active zone 41 of the catalyst bed 11 has a plurality of heat exchange tubes 54 embedded therein. The tubes 54 are preferably oriented into a plurality of substantially parallel tube banks 55 (see FIGS. 2–4) which are laterally spaced across the cross-flow path 27 and transverse thereto. Successive adjacent tube banks 55 establish successive adjacent catalyst zones 57 having localized heat removal (or heat addition) to effectively partition the catalyst bed reaction zone 41 into multiple catalyst layers (or stages) in a single reactor vessel. Each internally staged layer or catalyst zone 57 of the present invention is functionally equivalent to an externally intercooled (or interheated) staged bed of the prior art, but without the expense of additional vessels, piping, etc.

Figure 2:
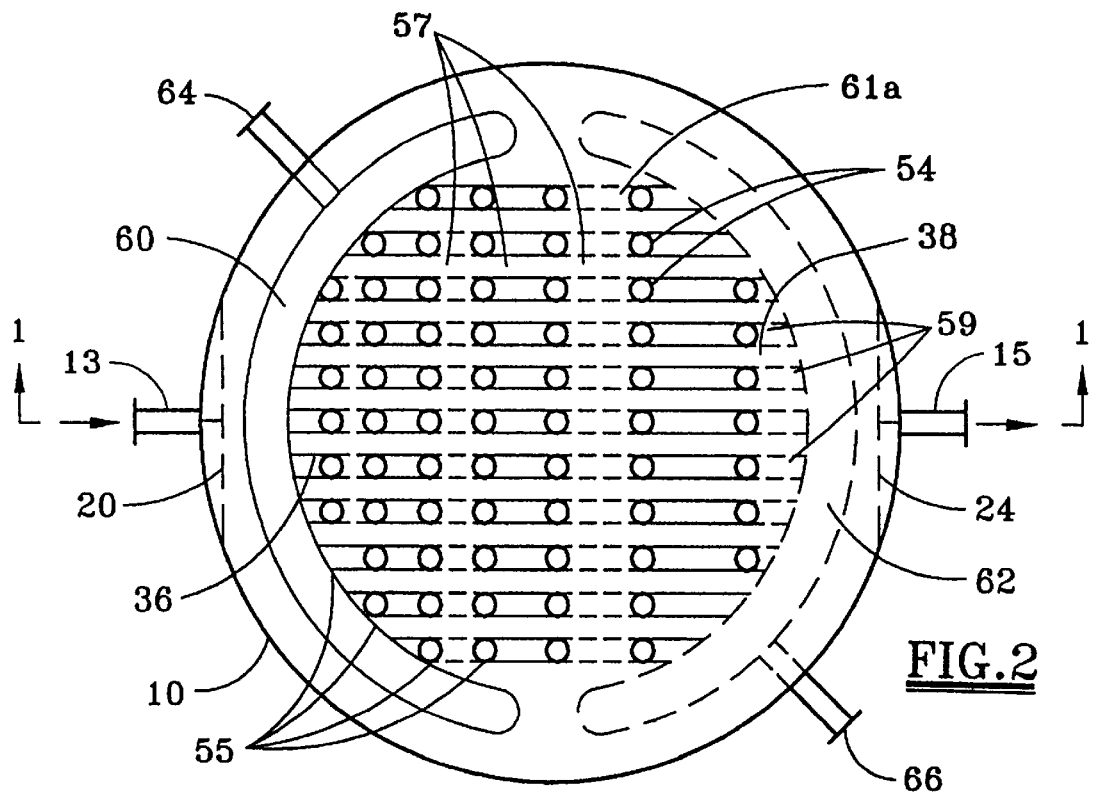
FIG. 2 illustrates a schematic plan view of the reactor of FIG. 1 as seen from the top wherein tube banks laterally spaced across the cross-flow path are more densely spaced at the reactor inlet and less densely spaced at the reactor outlet.
Figure 3:
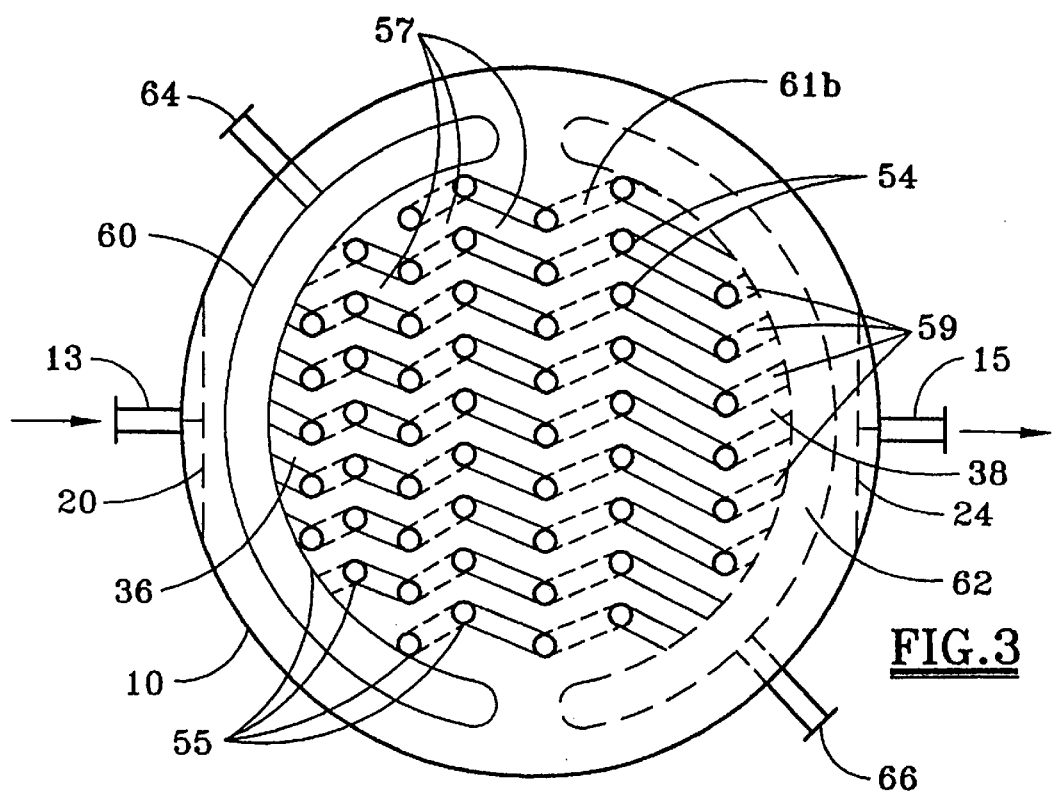
FIG. 3 illustrates a schematic plan view of the cross-flow, fixed-bed catalytic reactor of the present invention as seen from the top wherein coiled rows of internal heat exchange tubes have an angled orientation and the lateral tube banks are more densely spaced at the reactor inlet and less densely spaced at the reactor outlet.
Figure 4:
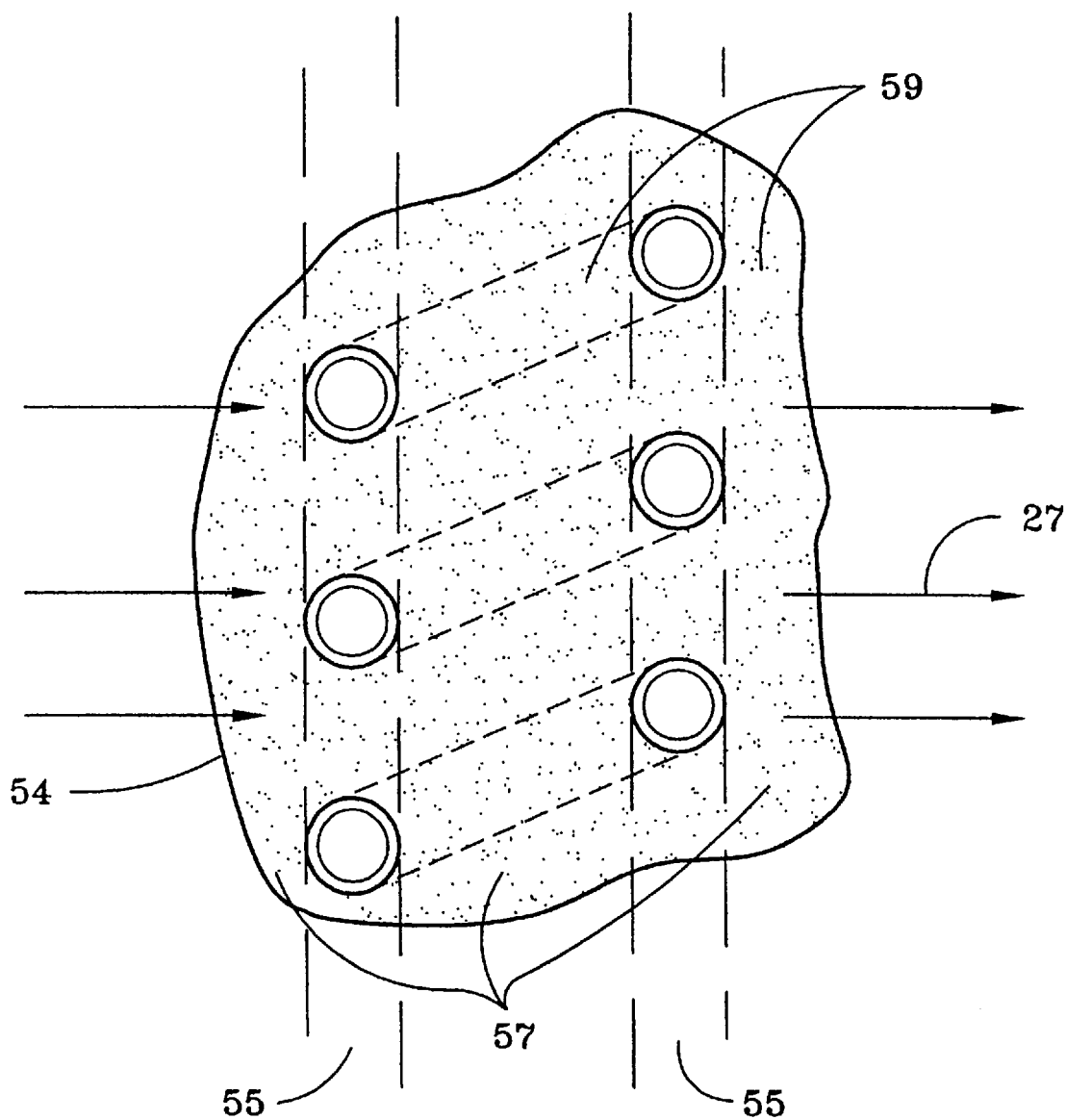
FIG. 4 illustrates an exploded view of the reactor of FIG. 3 detailing a portion of a catalyst stage between two successive tube banks.

The tubes 54 preferably extend axially in the reactor shell 12, although a transverse orientation could conceivably be used. Each axial tube 54 is preferably organized into coiled rows 59 extending along the cross-flow path 27 from the inlet end 36 to the outlet end 38 (see FIGS. 1–3) for ease of use, and to obtain greater compactness and heat exchange surface area in the limited space environment. Successive coiled rows 59 are spaced laterally along the cross-flow path 27 to form the tube banks 55. Alternatively, the tube banks 55 can be used on a once-through basis. Any coil orientation can be used, such as, for example, rows of tube having U-bend connections 61a which are planar to form tube banks 55 having a straight pitch as seen in FIGS. 1–2. Alternatively, tube bend connections 61b can be angled from the axial plane to give tube banks 55 with adjacent tubes having a triangular pitch as seen in FIGS. 3–4.

The number of tubes 54 used will depend on the space limitations in the housing 12 and the heat exchange requirements of the process in question. The internal relative spacing of tubes 54 within a bank and the spacing between separate banks (and partitioning of the bed 41) can be uniform or varied according to the type of reaction involved and specific reaction heat exchange requirements. Thus, for example, a greater number of heat exchange tubes 54 can be more densely spaced in a bank adjacent the gas distributor 20, progressively less densely spaced in tube banks spaced further from the gas distributor 20, and least densely spaced in the bank adjacent the product collector 24, if required to optimize the temperature progression (see FIGS. 2–3). In general, the optimal spacing of the tubes 54 will depend on the desired temperature progression of the process in question; manufacturing considerations; reactor housing design; catalyst type, particle size and design; and the like considerations for which empirical determination may be required.

The tube rows 59 have ends 56, 58 connected to manifolds 60, 62 for distributing the circulating heat exchange medium thereto. In a once-through embodiment, the axial tubes 54 will be connected collectively (not shown) to supply and return manifolds. The manifolds 60, 62 are conveniently located inside the reactor 10 in the respective heads 16, 18, but an external location could be used. The internally located manifolds 60, 62 have fluid inlet and outlet pipes 64, 66.

The type of heat exchange medium circulated through the tube rows 59 will depend on the operating temperature of the reactor 10. For a low temperature heat removal operation, the heat exchange medium is preferably boiler feed water (BFW). The boiler feed water heated by the reactor 10 is then fed to a steam generator (not shown) of a medium or high pressure steam system. For a high temperature heat removal operation, a molten salt system can be used. In a molten salt heat exchange system, a generally inert, thermally stable inorganic compound having an elevated melting point and a suitable specific heat is circulated by a pump between the tubes 54 and a reservoir. Hot salt exiting a return manifold can be used to generate high pressure steam in a high pressure steam system. Examples of suitable salts for an ammonia synthesis process include sodium nitrate, sodium nitrite, potassium nitrate, and the like.

Alternatively, the incoming reaction stream can be employed as coolant to recover excess reaction heat for preheating the feed gas prior to introduction to the reactor 10. In an endothermic reaction, a heating medium in the tube rows 59 can include high pressure steam, hot reaction effluent gas, molten salt, and the like.

The heat exchange medium can be circulated in cocurrent or countercurrent flow in accordance with the needs and requirements of a specific application. In exothermic processes, reaction heat recovered by the circulating coolant can be used for a number of different purposes depending on the process in question, including utilities generation, preheating high pressure boiler feed water and producing high pressure steam.

The reactor 10 includes respective catalyst-free zones 68, 70 in the housing upper and lower heads 16, 18 which contain a packing material. The packed catalyst-free zones 68, 70 provide space in the housing 12 for thermal expansion of the reactor internals. The packed catalyst-free zones 68, 70 are preferably filled with a low density packing material which is heat resistant. Examples of such filler material include ceramic and glass beads and fibers or wool. Ceramic wool packing at the bottom catalyst-free zone 70 provides a suitable support base for the catalyst particles of the bed in addition to a cushion for expansion of the reactor tubes 54. Ceramic wool packing in the top catalyst-free zone 68 fills an otherwise void space in the reactor 10 for catalyst bed gas seal purposes.

The walls of the reactor 10 in many high temperature processes can be insulated internally and/or externally to limit temperature exposure thereof. An excessive reactor temperature differential between the inlet and outlet sides could otherwise result in undesirable distortion and warping of the housing 12.

The reactor 10 has suitable manways 72, 74 for loading and unloading catalyst particles. Vertical orientation of the reactor 10 permits easy unloading of the catalyst by gravity through the bottom manway 74 in comparison to the prior art reactors. The internal heat exchange tubes 54 can be installed as a tube bundle by providing a flanged connection 76 between the upper head 16 and the shell 14. If desired, the tube bundle can be removed to facilitate catalyst unloading.

An alternate embodiment of the fixed-bed reactor of the present invention configured for axial process fluid flow and horizontal tube banks is seen in FIGS. 5 and 6. The reactor 78 houses catalyst bed 80 which is supported on a screen 82 or a similar catalyst retaining element. Catalyst-free zones 83, 84 above and below the bed are packed with glass wool or the like and are in fluid communication with process fluid inlet 85 and outlet 86, respectively. The horizontal tube banks 88 are formed from a plurality of U-bend tubes 88a,b between inlet and outlet manifolds 89, 90. As shown in FIG. 6, each tube such as at 88a is laterally spaced from adjacent tubes such as at 88b, and/or the tubes in each bank can also be vertically spaced as on a triangular pitch (now shown). An access port 91 which can be a manway is typically provided.

The axial-flow embodiment of FIGS. 5–6 is operated similarly to the cross-flow embodiment of FIGS. 1–4. Process fluid reactants are introduced at inlet 85 and distributed through the catalyst-free zone 83 into the catalyst bed 80. As the reactants pass down through the bed 80, they are passed sequentially through transverse catalyst layers and across the transverse tube banks 88 which supply or remove heat by indirect countercurrent heat exchange with the heat transfer fluid passing through the tube banks 88. For countercurrent heat exchange, the heat transfer fluid is supplied to manifold 89 and recovered from the manifold 90. Process fluid product is collected in the catalyst-free zone 84 and recovered from product outlet 86.

Where water/steam is used as the heat transfer fluid, boiler feed water is supplied via line 92 to the manifold 89 and at least partially vaporized fluid is supplied from the manifold 90 to steam drum 93. Steam is separated from the steam drum 93 overhead via line 94 and can be used, for example, to preheat the process fluid reactants in indirect flow heat exchanger 95. Condensate from steam drum 93 is recirculated via line 96 and pump 97 to recirculation manifold 98.

Alternatively or additionally, makeup boiler feed water can be supplied directly to the steam drum 93 via line 99.

The axial-flow embodiment of FIGS. 5 and 6 is desirably used in small plants where the size of the reactor 78 makes the vertical tube orientation difficult. The axial-flow reactor is also advantageously used in situations where the temperature difference between the inlet and outlet process fluid reactants is relatively high since this would otherwise create uneven thermal stresses in the cross-flow reactor, such as, for example, in an autothermal reforming reactor. In this situation the high temperature fluid is supplied tubeside to minimize thermal stress on the reactor shell. In this manner, the tubes can be constructed from different alloys, depending on the temperature service, e.g. hastalloy and/or inconel near the inlet and stainless steel near the relatively cooler outlet, while the shell can be constructed from a cheaper material such as carbon steel which is satisfactory for a relatively lower temperature service.

The present invention is further illustrated by reference to the following examples.

EXAMPLE 1

High and low temperature shift reactors in a carbon monoxide shift process (for the production of hydrogen and/or a hydrogen/carbon monoxide synthesis gas) are replaced by the a single, low temperature reactor 10 of the present invention having internal cooling coils. A low temperature shift catalyst having a small particle size is installed in the reactor shell. The coil bends are spaced so that less than 5% of the total catalyst volume is located between two adjacent tube banks at the reactor inlet zone increasing to a spacing encompassing about 10% of the catalyst volume (between successive tube banks) at the reactor outlet. This bank spacing takes into account the observation that the reaction is fastest (and generating most heat) where the carbon monoxide concentration is highest and furthest from equilibrium concentration. At the reactor outlet zone, carbon monoxide concentration is close to an equilibrium concentration and fewer cooling tubes are desired to avoid overcooling. Countercurrently circulating boiler feed water is used as the reactor cooling medium.

The reaction stream is introduced to the reactor at a temperature between 180° C. and 240° C. A distributed stream flows across the catalyst bed, reacting stage-to-stage and being cooled incrementally. In the stages closest to the inlet zone, the temperature initially rises to 220°–250° C. followed by 20°–30° C. cooling across each tube bank. The amount of temperature rise and cooling decreases towards the latter stages. The reaction effluent stream exits the reactor at a temperature of 180°–210° C. (approximately 10°–30° C. above the stream dew point temperature) since a lower exit temperature gives a more favorable carbon monoxide equilibrium conversion value. The boiler feed water temperature is not lower than the process stream dew point temperature as it is important to maintain the process stream at least 10° C. above the dew point. The actual operating temperature will vary depending on the process operating pressure and the steam to gas ratio.

The advantages of the above process over the art include elimination of the high temperature shift reactor, a lower pressure drop using a cross-flow arrangement, replacing two reactors with one and the associated savings in capital equipment costs, and a conversion rate closer to optimal due to an increased number of intercooled stages. Other advantages include catalyst savings and reduced plant start-up time.

EXAMPLE 2

Figure 7:
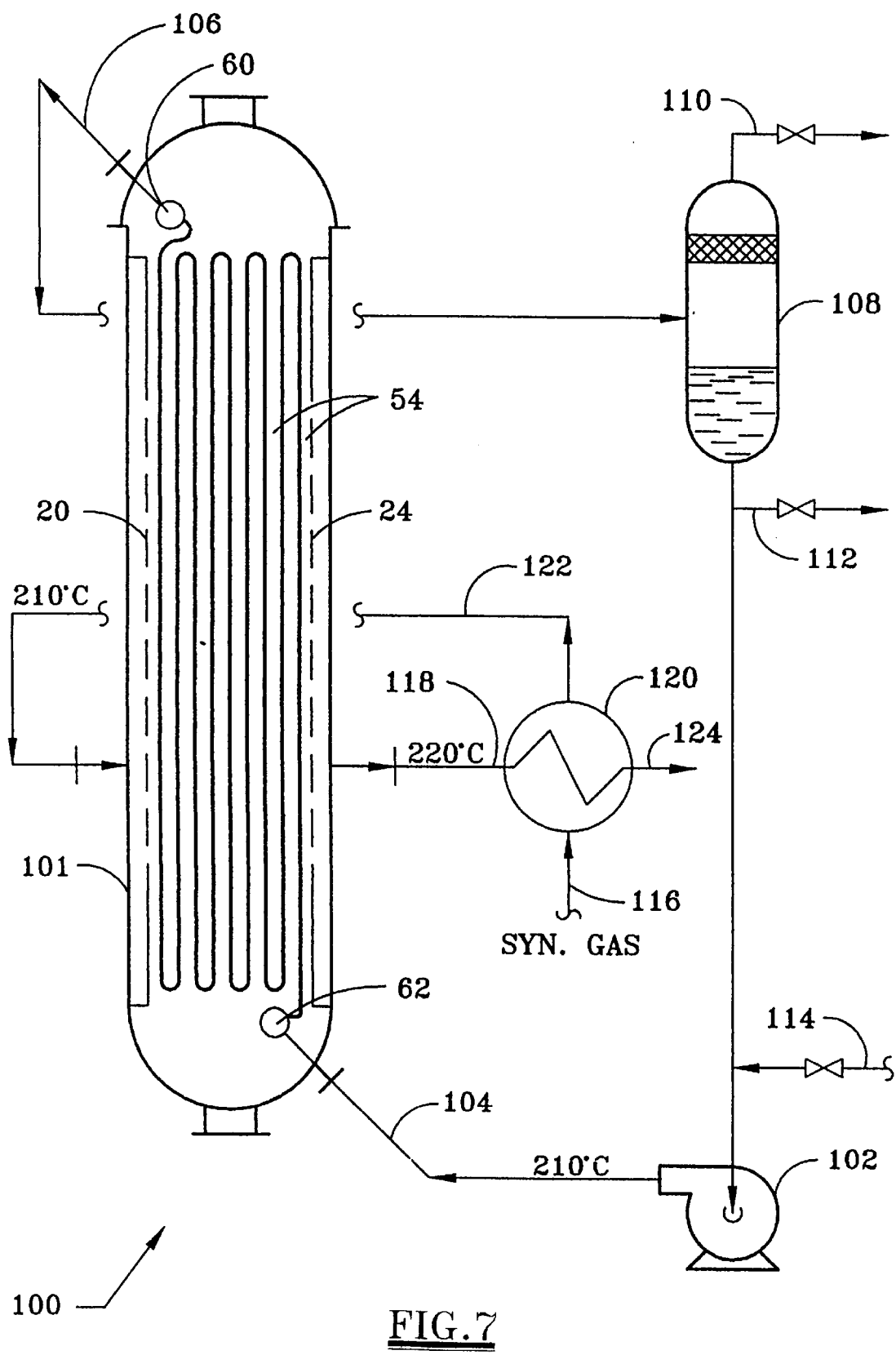
FIG. 7 illustrates a schematic flow diagram of a methanol synthesis process employing the reactor of FIG. 1.

As seen in FIG. 7, a reactor 101 similar to that described in Example 1 can be used in a methanol synthesis process 100 except that the catalyst volume between adjacent tube banks does not exceed 5%, the reactor operating temperature varies between 230°–290° C. and boiler feed water is circulated through the reactor tubes at an inlet temperature of about 210° C. Boiler feed water is circulated by pump 102 via line 104 to the reactor supply manifold 62. Vaporized water from the return manifold 60 is directed via line 106 to a steam drum 108 of a medium pressure steam system (e.g. 3–4.2 MPa). In the steam drum 108, steam is separated from condensate and withdrawn through line 110. Blowdown condensate is removed from the drum 108 through line 112, and the make-up water is supplied through line 114.

A syngas feed stream 116 is preferably preheated by an exchange of heat against a hot methanol product stream 118 in a cross-exchanger or an indirect flow heat exchanger 120 to produce a coated product stream 124. The hot methanol product stream 118 exits the reactor 101 at a temperature of about 210°–230° C. A syngas stream heated to a temperature of about 190°–210° C. is introduced to the reactor 101 via line 122.

Advantages of the present methanol synthesis process over the prior art include higher conversion per pass, a single reactor vessel rather than multiple reactors, lower pressure drop, lower catalyst usage, easier catalyst reduction and enhanced heat utilization since a bulk of the methanol synthesis heat is recovered for steam generation.

EXAMPLE 3A

Figure 8:
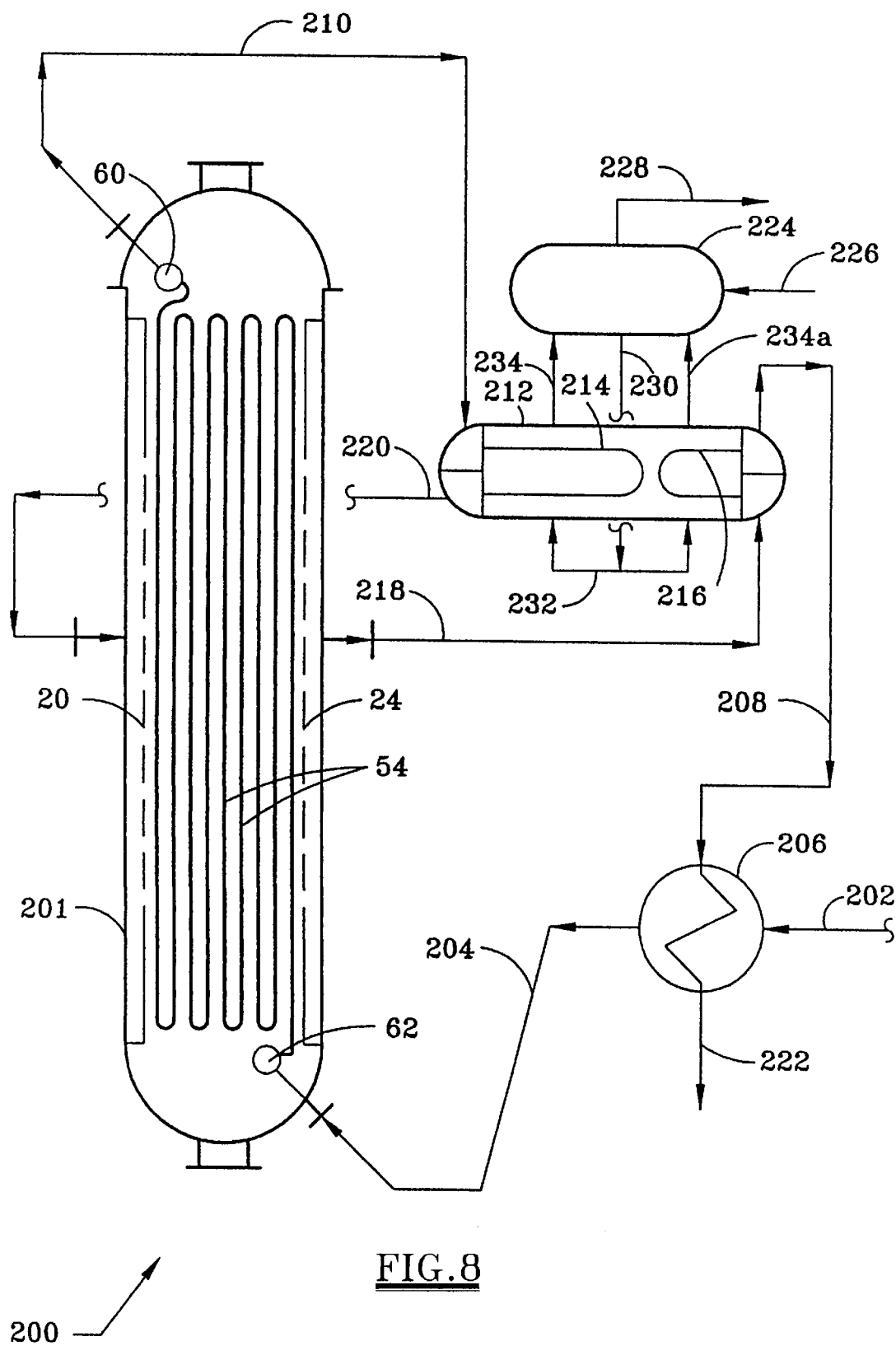
FIG. 8 illustrates a schematic flow diagram of an ammonia synthesis process employing the reactor of FIG. 1 wherein the tube-side coolant is incoming synthesis gas.

As seen in FIG. 8, a reactor 201 similar to that described in Example 1 can be used for an ammonia synthesis process 200 except that a higher operating temperature necessitates a higher temperature coolant and internal insulation to protect the reactor shell from possible distortion problems since an inlet/outlet temperature differential is relatively large. A syngas inlet stream is used to cool the reactor and generate high pressure steam. The catalyst has a particle size of 1 to 1.5 mm.

A syngas stream 202 used as a reactor heat transfer fluid is preheated by an exchange of heat against a hot product stream 204 in a cross-exchanger 206. A syngas stream heated to a temperature of approximately 330°–380° C. is directed to the reactor supply manifold 62 via line 208 for cooling the reactor catalyst bed. A syngas stream having a temperature of about 480° C. is directed from the return manifold 60 to a high pressure steam generation system via line 210 to generate high pressure steam (e.g. 12.5 MPa, 328° C.).

A steam generator 212 as seen in FIG. 6 has two separate tube-side bundles 214, 216 in a single shell for recovering heat from the hot syngas stream 210 and a hot product stream 218. The product stream 218 leaving the reactor 201 has a temperature of about 440° C. The syngas stream leaving the steam generator 212 is directed to the reactor 201 via line 220. The syngas stream 220 is introduced to the reactor 201 at a temperature of about 360°–380° C. The product stream exiting the steam generator 212 is directed to the cross-exchanger 206 via line 208. A cooled product stream is withdrawn from the cross-exchanger 208 via line 222. A condensate tank 224 having a condensate makeup line 226 and a steam withdrawal line 228 supplies condensate to the steam generator 212 via line 230. The makeup condensate is distributed to tube bundles 214, 216 by a condensate supply manifold 232. Vaporized condensate is directed to the condensate tank 224 via lines 234*a*, 234*b*.

The partitioned multi-stage arrangement of the catalyst bed allows an efficient removal of reaction heat for a lower operating temperature. Initially, the reaction kinetics are favored by higher temperature and temperature rise between 450°–500° C. is desired. Intercooling reduces the gas temperature approximately 10°–30° C. prior to the next stage. In the middle sections (with an increase in ammonia concentration), the reaction rate is equilibrium driven and equilibrium conversion is favored by a reduced gas temperature. The temperature is somewhat less at the midstage—about 440°14 470° C.—and lower at the outlet stage—about 420°14 440° C. The tube banks are arranged to partition the catalyst so that each stage can operate at an optimal temperature for a given position in the reactor. For ammonia synthesis, the temperature progression of successive stages is one of a steadily decreasing profile. The actual reactor operating temperatures depend on system pressure, concentration of ammonia in the feed syngas, catalyst volume, catalyst size, inerts level, and the like operating parameters.

Advantages of the present ammonia synthesis process over the prior art include a higher conversion per pass, lower pressure drop, efficient recovery of reaction heat, lower catalyst volume, and a single reactor instead of a multiple reactor arrangement.

EXAMPLE 3B

Figure 9:
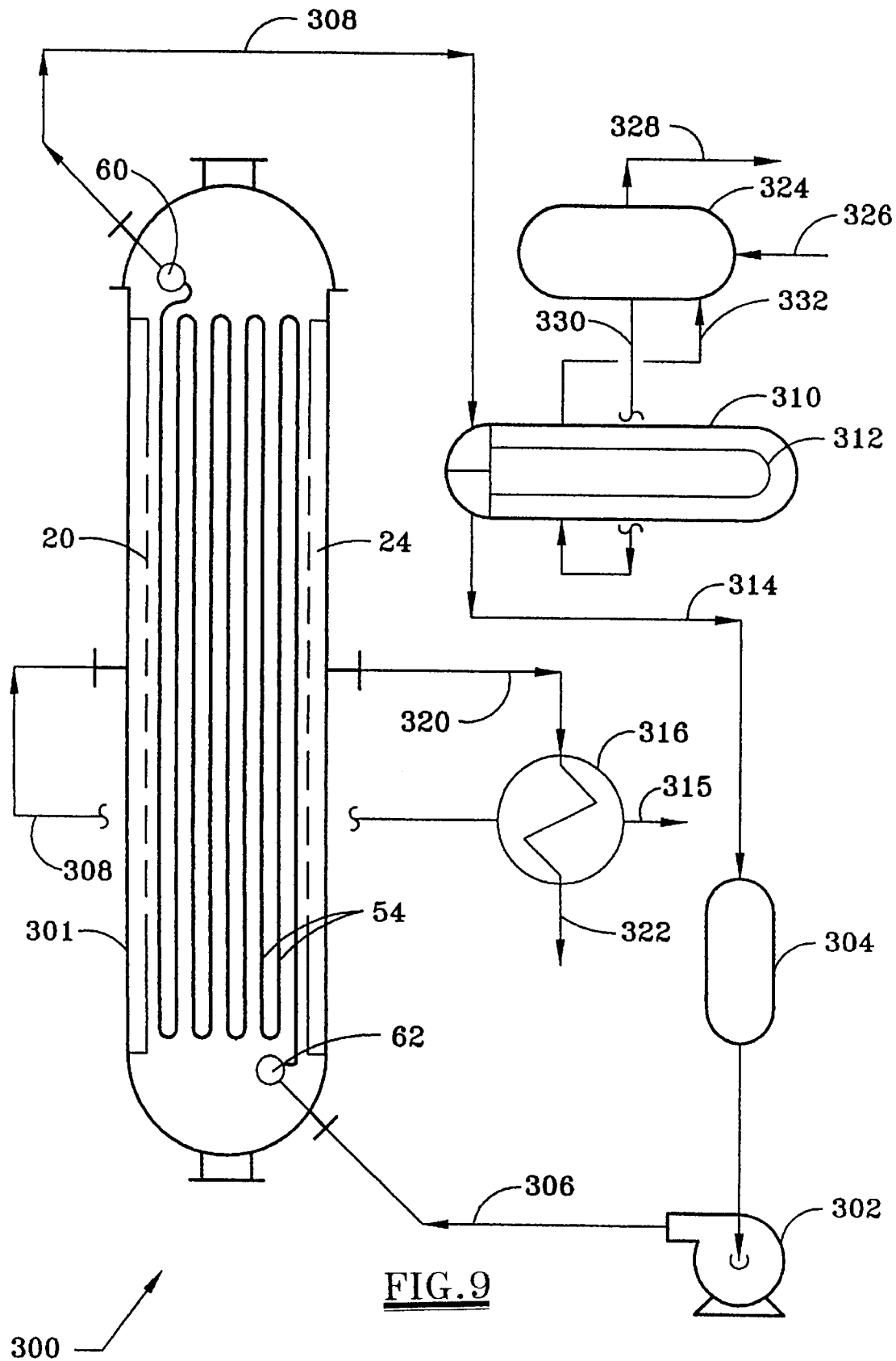
FIG. 9 illustrates a schematic flow diagram of an ammonia synthesis process employing the reactor of FIG. 1 wherein the tube-side coolant is a molten salt.

As seen in FIG. 9, ammonia is synthesized in an ammonia synthesis process 300 similar to that described in Example 3A using a cross-flow, fixed-bed reactor 301, except that the reactor heat exchange medium is a molten salt, such as an eutectic mixture of potassium nitrate, sodium nitrate and sodium nitrite (MP 142° C.). A pump 302 circulates a molten salt stream from a salt sump tank 304 to the reactor supply manifold 62 via line 306 for cooling the reactor catalyst bed. The temperature of the molten salt stream 306 is about 340°–370° C. A higher temperature molten salt stream is directed from the return manifold 60 to a high pressure steam generation system via line 308 to generate high pressure steam (e.g. 12.5 MPa, 328° C.). The boiler 310 has a U-shaped tube-side 312 for recovering heat from the higher temperature molten salt stream 308. A cooled molten salt stream exiting the boiler 310 via line 314 is fed to the sump tank 304.

A syngas stream 315 is heated to a temperature suitable for ammonia synthesis by an exchange of heat against a hot product stream in a cross-exchanger 316. A syngas stream heated to a temperature of about 380°–400° C. is introduced to the reactor 301 via line 318. The hot product stream having a temperature of about 440°–460° C. is directed to the cross-exchanger 316 via line 320. A cooled product stream is obtained via line 322.

The boiler 310 is supplied with condensate from a condensate tank 324. The condensate tank 324 has a condensate makeup line 326 and a steam withdrawal line 328. Condensate is fed to the boiler 310 via line 330. Vaporized condensate is passed to the condensate tank 324 via line 332.

EXAMPLE 4

Figure 10:
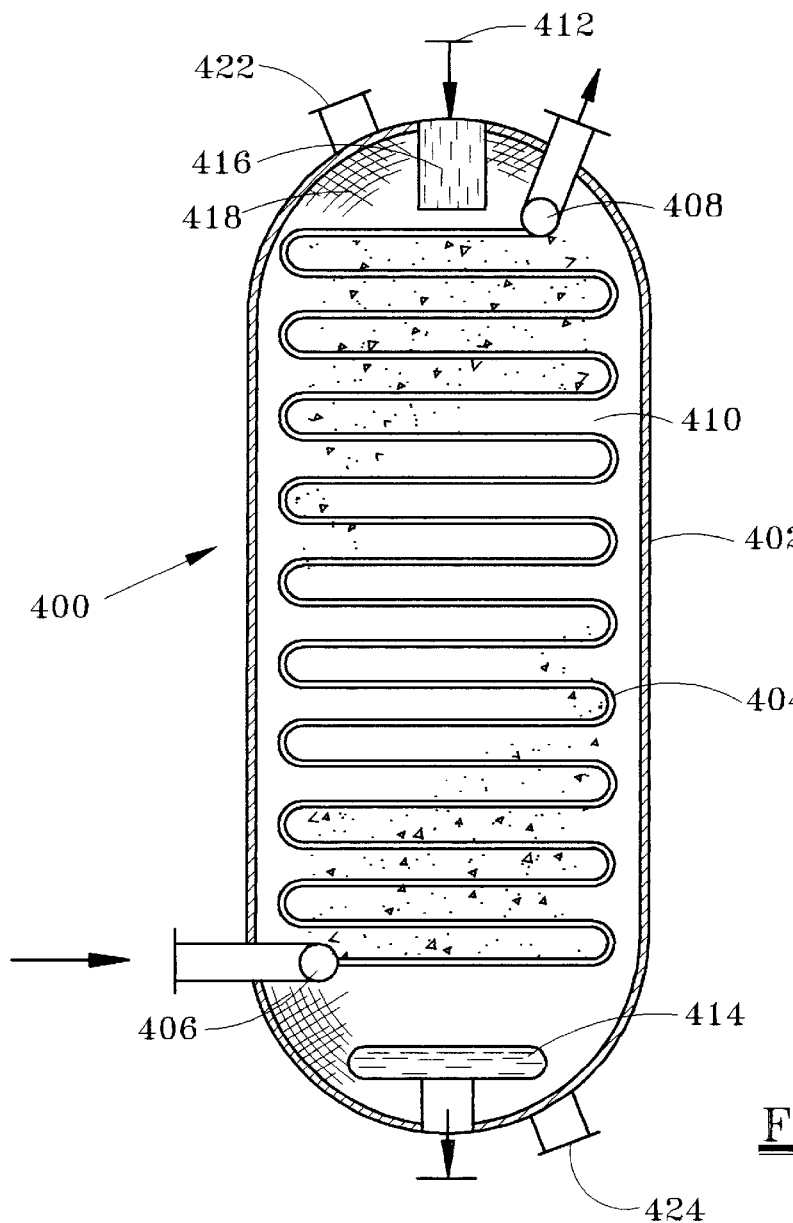
FIG. 10 illustrates a schematic side view of another embodiment of the axial flow reactor of this invention.
Figure 11:
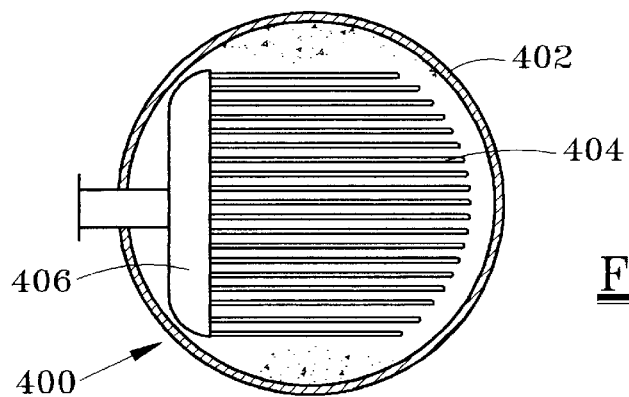
FIG. 11 illustrates a plan view of the reactor 10.

As seen in FIGS. 10–11, an axially oriented reforming exchanger reactor 400 is configured for reforming service in an ammonia or methanol plant. A reactor wall 402 is internally insulated and has transverse multi-tube coil banks 404 arranged in single or multiple rows from bottom manifold 406 to exit manifold 408. The shell side of the reactor 400 is filed with reforming catalyst 410. The reforming pressure is from 30 to 60 kg/cm$^2$ depending on the process design parameters. A high temperature reformed gas is flowing in the tube side, and hydrocarbon reactants on the shell side. A preheated feed of hydrocarbon and steam at about 500° C. up to about 650° C. enters at a top 412 of the reactor 402. The feed is distributed to the catalyst bed 410. The hot reformed gas from a secondary reformer (not shown) at about 1000° C. is flowing in the tube banks 404 from the bottom manifold 406. The hot reformed gas gives up heat to the reactants and leaves the top manifold 408 at about 600° C., e.g. 50° to 100° C. above the reactant inlet temperature. The feed reactant flows down through the catalyst bed 410 and passes catalyst layers and the coil banks 404 alternately. The reactants pick up heat from the tubes 404 and are reformed as they pass over the catalyst 410 between alternating horizontal passes of the tubes 404. A partially reformed gas is collected at a product collector 414, leaving the bottom of the reforming exchanger reactor 400 at about 700° C. Up to 35 percent of the hydrocarbon feed is reformed in the reforming exchanger 400. Therefore, the relatively high cost of a primary reformer is not required. The partially reformed reactants exit to an oxygen-enriched, using excess air in the case of an ammonia plant or oxygen in the case of a methanol plant, secondary reformer (not shown) where oxygen combustion in the secondary reformer provides additional heat for completing the remaining reforming at elevated temperature. The hot process gas rises in the tubes 404 and is gradually cooled. Therefore, the materials of construction of the tube banks 404 can be changed from a higher grade adjacent the inlet manifold 406 to a lower grade adjacent the exit manifold 408, in accordance with the coil temperature profile and requirements.

There is a perforated inlet gas distributor 416 at the reactor inlet 412 for distribution of gas to the catalyst bed 410. A catalyst-free zone 418 is provided for any expansion of the catalyst 410 and coil banks 404. The catalyst-free zone 418 can be filled with a low density, flexible and temperature-resistant material such as fiberglass wool, for example. The exit product gas collector 414 has a perforated design. Manways 422, 424 are provided for catalyst loading and unloading, respectively.

In addition to a reforming exchanger, additional applications for the axial-flow reactor 400 are listed in Table 1 which shows typical reactants, reactant temperature range, tubeside fluid and tubeside temperature range.

TABLE 1

| Reactor Application | Reactants | Reactants Temperature Range (°C.) | Tubeside Fluid | Tubeside Temperature Range (°C.) |
|---|---|---|---|---|
| Ammonia synthesis | Ammonia syngas | 350–500 | Syngas | 300–450 |
|  |  |  | Boiler feed water | 250–325 |
|  |  |  | Molten salt | 300–400 |
| Methanol synthesis | Methanol syngas | 200–280 | Boiler feed water/ steam generation | 200–260 |
| Shift converter | Shift Gas | 200–270 | Boiler feed water | 170–250 |

TABLE 1-continued

| Reactor Application | Reactants | Reactants Temperature Range (°C.) | Tubeside Fluid | Tubeside Temperature Range (°C.) |
|---|---|---|---|---|
| Sour shift conversion | Sour shift gas | 210–450 | Boiler feed water/ high pressure steam generation | 200–325 |
| Methanation | Methanation syngas | 300–450 | Boiler feed water/ high pressure steam generation | 300–325 |
| Maleic anhydride | Hydrocarbon/air | 370–450 | Molten salt | 300–420 |
| Reforming exchanger | Hydrocarbon/ steam | 400–750 | Secondary reformer effluent | 500–1100 |

The present catalytic reactor and catalytic reaction process are illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

I claim:

1. A catalytic reaction process, comprising the steps of:
   introducing process fluid reactants to a reactant distributor formed adjacent an upper region of a fixed-bed catalytic reactor comprising a generally cylindrical catalyst bed extending axially upwardly from a bottom region to the upper region spaced therefrom, a flow path for fluid to pass between the upper and bottom regions, through a plurality of generally transverse catalyst layers and tube banks comprising U-bend tubes disposed in the catalyst bed, a supply manifold for feeding a heat transfer fluid to the tube banks, and an exit manifold for gathering heat transfer fluid from the tube banks;
   passing the process fluid reactants along the flow path from the reactant distributor axially through the transverse catalyst layers and tube banks to a product collector for catalytic reaction in the catalyst layers, wherein the product collector is formed adjacent the bottom region of the reactor;
   circulating a heat transfer fluid countercurrently from the supply manifold, through the tube banks wherein heat is exchanged between said heat transfer fluid and the process fluid reactants passing across the tube banks between the catalyst layers, and to the return manifold; and
   collecting process fluid products at the product collector.

2. The process of claim 1, wherein internal walls of the reactor are thermally insulated.

3. The process of claim 1, wherein the product collector comprises a perforated gas collection pipe mounted on the inside wall of the reactor and a layer of low density heat-resistant material to support the catalyst bed.

4. The process of claim 3, wherein the reactor includes a catalyst-free zone adjacent the upper region of sufficient size to permit thermal expansion of the catalyst and the tube banks.

5. The process of claim 4, wherein the catalyst-free zone comprises a low density, heat resistant filler material.

6. The process of claim 1, wherein each tube bank comprises a plurality of laterally spaced transverse tubes.

7. The reactor of claim 6, wherein total heat transfer surface area and lateral spacing of the tubes in each tube bank are relatively varied among the separate tube banks.

8. The reactor of claim 7, wherein the tubes are most densely spaced in the bank adjacent the upper region, are progressively less densely spaced in tube banks spaced further from the upper region, and least densely spaced in the bank adjacent the bottom region.

9. The process of claim 1, wherein the heat transfer fluid comprises boiler feed water, steam, molten salt, or a process fluid.

10. The process of claim 1, wherein the process fluid reactants comprise generally stoichiometric hydrogen and nitrogen, and the process fluid product comprises ammonia.

11. The process of claim 1, further comprising the steps of:
   preheating the process fluid reactants in an indirect flow heat exchanger against a stream of the process fluid products;
   passing the preheated fluid reactants through the tube banks as the heat transfer fluid flowing inside said tube banks;
   passing the process fluid reactants from the exit manifold to a boiler to heat boiler feed water and cool the process fluid reactants to form a preconditioned reactant stream;
   passing the preconditioned reactant stream through the flow path of the catalytic reactor;
   passing the process fluid product from the product collector through a boiler to heat boiler feed water and form a partially cooled product stream; and
   supplying the partially cooled product stream to the indirect flow heat exchanger for the reactant preheating step.

12. The process of claim 10, further comprising the steps of:
   preheating the process fluid reactants in an indirect flow heat exchanger against a stream of the process fluid product;
   passing the preheated reactants through the flow path of the catalytic reactor;
   passing a molten salt through the tube banks as the heat transfer fluid; and
   passing heated molten salt from the return manifold through a boiler to heat boiler feed water and cool the molten salt for recirculation through the tube banks.

13. The process of claim 1 wherein the reactants comprise shift gas including a mixture of hydrogen, carbon monoxide, carbon dioxide, and steam, the process fluid product is richer in hydrogen and carbon dioxide than said process fluid reactants.

14. The process of claim 13, further comprising:
   supplying boiler feed water at a temperature between about 150°–190° C. as the heat transfer fluid to the supply manifold;

supplying shift gas at a temperature between about 180°14 240° C. to the reactant distributor;

maintaining the maximum temperature in the catalyst bed below about 270° C.; and maintaining the process fluid product collected at the product collector at least about 10° C. above its dewpoint.

15. The process of claim 14, wherein:

a first catalyst layer disposed between the reactant distributor and a first tube bank contains less than about 5 percent of the total catalyst volume of the catalyst bed;

a last catalyst layer disposed between a last tube bank and the product collector contains less than about 10 percent of the total catalyst volume of the catalyst bed; and intermediate individual catalyst layers contain a generally increasing volume of the total catalyst volume of the catalyst bed from adjacent the first catalyst layer to adjacent the last catalyst layer.

16. The process of claim 1, wherein the process fluid reactants comprise synthesis gas including hydrogen and carbon oxides, and the process fluid product comprises methanol.

17. The process of claim 16, further comprising the steps of:

preheating the synthesis gas in an indirect flow heat exchanger against a stream of the process fluid product from the product collector;

passing the preheated synthesis gas through the flow path of the catalytic reactor; and circulating boiler feed water through the tube banks as a cooling medium.

18. The process of claim 17, wherein the boiler feed water circulation includes pumping boiler feed water in a supply line from a steam drum to the supply manifold, introducing at least partially vaporized fluid from the return manifold to the steam drum, collecting steam and condensate for separation in the steam drum, obtaining steam from the steam drum, blowing down a portion of the condensate from the steam drum, and supplying makeup boiler feed water to the supply line.

19. The process of claim 1, wherein the reactants comprise a mixture of hydrocarbon and air, and the process fluid product comprises maleic anhydride.

* * * * *